United States Patent
Guibert et al.

(10) Patent No.: US 7,938,359 B2
(45) Date of Patent: May 10, 2011

(54) PROPULSION SYSTEM WITH INTEGRATED PYLON

(75) Inventors: Thibaud Jean-Baptiste Guibert, Paris (FR); Guillaume Lefort, Paris (FR); Marc Patrick Tesniere, Champcueil (FR)

(73) Assignee: SNECMA, Paris (FR)

( * ) Notice: Subject to any disclaimer, the term of this patent is extended or adjusted under 35 U.S.C. 154(b) by 301 days.

(21) Appl. No.: 11/857,735

(22) Filed: Sep. 19, 2007

(65) Prior Publication Data

US 2008/0067287 A1    Mar. 20, 2008

(30) Foreign Application Priority Data

Sep. 20, 2006    (FR) ..................... 06 08216

(51) Int. Cl.
*B64D 27/00* (2006.01)
*B64D 27/26* (2006.01)
*B64D 29/06* (2006.01)

(52) U.S. Cl. .......... 244/54; 248/554; 248/556; 60/226.1
(58) Field of Classification Search ............ 244/54, 244/53 R, 53 B; 248/554, 555, 556; 60/797, 60/226.1

See application file for complete search history.

(56) References Cited

U.S. PATENT DOCUMENTS

| 2,943,449 | A |   | 7/1960 | Kurti |
| 3,848,832 | A |   | 11/1974 | Stanley et al. |
| 4,043,522 | A | * | 8/1977 | Vetter ............... 244/54 |
| 4,213,585 | A | * | 7/1980 | Murphy ............ 244/54 |
| 4,266,741 | A | * | 5/1981 | Murphy ............ 244/54 |
| 4,922,711 | A | * | 5/1990 | Brown .............. 60/796 |
| 5,350,136 | A | * | 9/1994 | Prosser et al. ..... 244/129.4 |

FOREIGN PATENT DOCUMENTS

| FR | 2 873 988 A1 | 2/2006 |
| GB | 2 021 696 A | 12/1979 |
| GB | 2 384 827 A | 8/2003 |

OTHER PUBLICATIONS

U.S. Appl. No. 12/103,258, filed Apr. 15, 2008, Dron, et al.
U.S. Appl. No. 11/856,468, filed Sep. 17, 2007, Guibert, et al.

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

A propulsion system for an airplane having an integrated pylon includes a bypass turbojet and a nacelle. The nacelle has a downstream cylindrical part which is rigid and is attached at its upstream end to an intermediate case of the engine. This downstream cylindrical part also includes a longitudinal beam for attaching rods to secure the engine to the airplane.

12 Claims, 4 Drawing Sheets

PROPULSION SYSTEM WITH INTEGRATED PYLON

BACKGROUND OF THE INVENTION AND DESCRIPTION OF THE PRIOR ART

The invention relates to a bypass turbojet engine airplane propulsion system comprising a nacelle borne by an intermediate case of the engine and which delimits a space for the flow of bypass air around the turbojet, this bypass air being intended to provide more than 80% of the thrust.

The engine is generally secured under a wing or to part of the fuselage or of the empennage of the airplane, by means of a pylon which is a part that is very robust and very heavy and is attached to the engine at several points through suspensions through which the loads transmitted between the engine and the airplane pass.

The fact that the engine is attached using a pylon and suspensions also means that the thrust is reacted along a line that is offset from the axis of the engine, leading to overall flexing in the engine case line. The pylon is also attached to the engine by elements which cross and partially obstruct the stream through which the bypass air flows through the nacelle, meaning that the radial dimensions of the nacelle have to be increased accordingly even though airplane manufacturers would rather wish to reduce these dimensions, particularly in the case of engines with high bypass ratios.

SUMMARY OF THE INVENTION

A subject of the present invention is a propulsion system of the type described hereinabove which avoids the aforementioned disadvantages of the prior art in a way that is simple, effective and economical.

To these ends, the present invention proposes an integrated propulsion system comprising an airplane bypass turbojet engine and a nacelle borne by an intermediate case of the engine which delimits an annular space for the flow of bypass air around the turbojet, this system being one wherein the nacelle comprises a downstream cylindrical part which is rigid and at its upstream end comprises an annular attachment flange over at least 180° of the external circumference of the intermediate case, this cylindrical part supporting and guiding the turbojet exhaust case at its downstream end and also comprising means for attaching members for securing the engine to part of the airplane.

This downstream cylindrical part of the nacelle, termed the "OFS" (Outer Fixed Structure) in the art, has a rigidity which allows it to transmit loads between the engine and the airplane. Attaching it to the intermediate case of the engine allows it to support the engine in full and makes it possible to eliminate the suspensions and, in part, the pylon used in the prior art, which is replaced by far lighter weight means for securing to the airplane, resulting in a considerable weight saving. This attachment also makes it possible to eliminate the local load being points that were to be found in the prior art and allows the loads transmitted to be spread over a wider area, extending over at least 180° about the axis at the external periphery of the intermediate case and preferably over 360° and therefore over the entire external periphery of the intermediate case.

According to another feature of the invention, the means for attaching the securing members to the airplane comprise a longitudinal beam attached to or formed as an additional thickness of the downstream cylindrical part of the nacelle, and the members for securing to the airplane are formed of links or connecting rods fixed at their ends to this longitudinal beam and to the airplane, constituting a rigid and nondeformable system.

The downstream end of the cylindrical part is connected to the exhaust case of the turbojet by rods and connecting members that allow axial and radial expansion of the exhaust case as the engine is operating.

As an alternative, the downstream end of the aforementioned cylindrical part is connected to the exhaust case via an auxiliary case which surrounds the exhaust case and which is connected by links or connecting rods to the downstream cylindrical part of the nacelle.

In the preferred embodiment of the invention, the downstream cylindrical part of the nacelle comprises a framework to which fairing or cowling panels are attached, forming an external wall for guiding the bypass air generated by the engine fan.

A cylindrical shroud forming a radially internal wall for guiding the bypass air is advantageously attached at its upstream end to the intermediate case and may be connected to the exhaust case by means that allow axial and radial expansion of this exhaust case as the engine is operating.

The engine according to the invention may or may not be equipped with a thrust reverser. If it is, the bypass air generated by the fan is diverted, when the thrust reverser is in operation, through a perforated part of the framework of the downstream cylindrical part of the nacelle.

The fairing or cowling panels attached to this framework can then be moved translationally between an upstream position in which they close off this perforated part of the framework and a downstream position in which they uncover this perforated part and allow the thrust reverser to operate.

The invention also relates to a cylindrical downstream part of an airplane engine nacelle of the aforementioned type and which comprises an external longitudinal beam comprising means for securing the means for attaching to an airplane and, at one end, an annular attachment flange over at least 180° of the external circumference of an intermediate case of the engine.

In one particular embodiment of the invention, this cylindrical part comprises a framework a perforated end of which allows cascades to be installed for the thrust reverser, and mobile cowling panels for opening and closing this perforated end.

In general, the engine according to the invention can be attached by the aforementioned means to any part of an airplane, for example under a wing, on a wing, on a structure incorporated into the wing, on the fuselage or on the empennage of the airplane.

BRIEF DESCRIPTION OF THE DRAWINGS

The invention will be better understood and other features, details and advantages thereof will become more clearly apparent from reading the description which follows, given by way of example with reference to the attached drawings in which.

DESCRIPTION OF THE PREFERRED EMBODIMENTS

Figure 1:
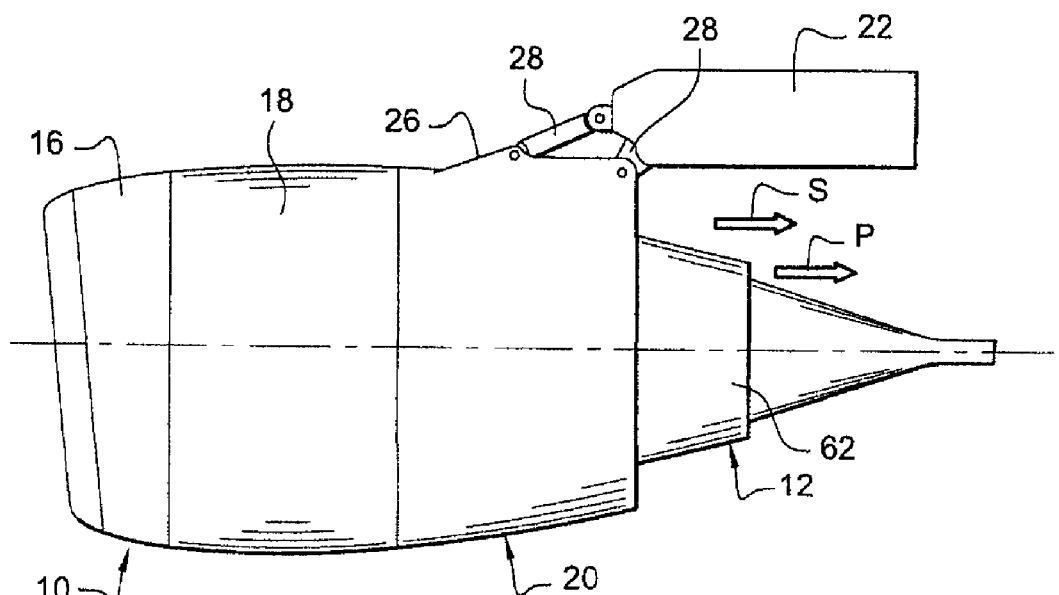
FIG. 1 is a schematic side view of a system according to the invention fixed under the wing of an airplane.
Figure 2:
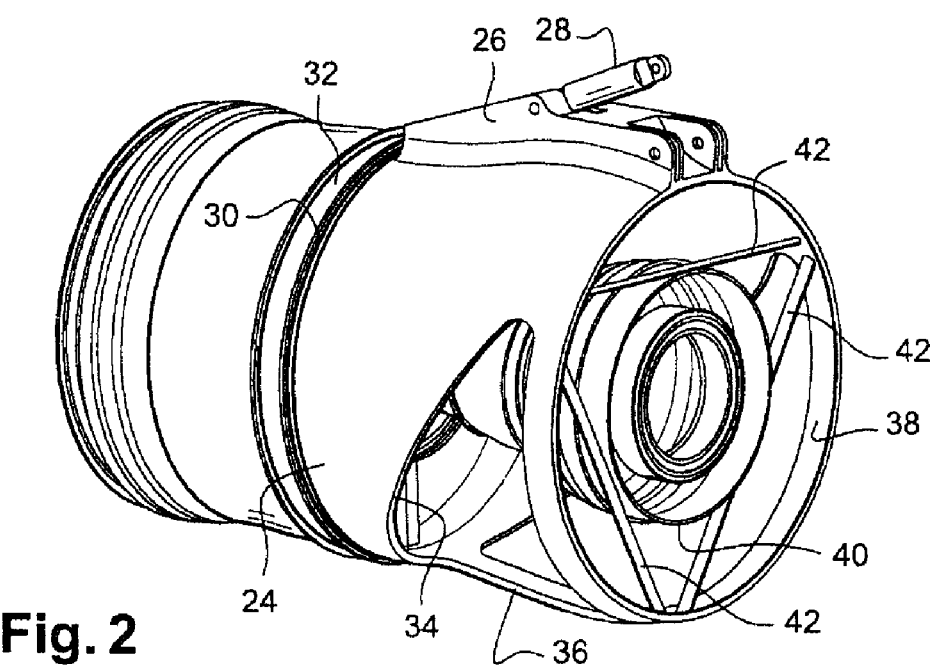
FIG. 2 is a schematic perspective view of part of the system of FIG. 1.

The propulsion assembly depicted schematically in FIGS. 1 and 2 essentially comprises a nacelle 10 of cylindrical shape which surrounds a turbojet 12 only the rear part of which is visible in FIG. 1 and a fan impeller (not visible) mounted inside the nacelle 10 in front of the engine, this fan impeller being driven by the turbine of the turbojet in a way well known to those skilled in the art.

While the engine is in operation, the fan generates a bypass-air stream which flows through the nacelle 10 toward the rear around the turbojet 12 and which produces 80% of the thrust provided by the engine. Some of the air entering the engine 10 is fed into the turbojet inlet compressor and is then mixed with fuel in the combustion chamber. The combustion gases leaving the combustion chamber pass through the turbine and are then ejected into an exhaust case and leave the turbojet as indicated by the arrow P in FIG. 1, in which the nearby arrow S denotes the outlet of the bypass air.

The engine nacelle 10 comprises an upstream cylindrical part 16 known as the air intake, an intermediate cylindrical part 18 formed of cowls borne by the intermediate case of the engine, and a downstream cylindrical part 20 generally termed the "OFS" (Outer Fixed Structure) which, according to the invention, is a structural part transmitting loads and used to attach the engine 10 to a bearing structure 22 forming part of an airplane wing.

This downstream cylindrical part 20 comprises a rigid cylindrical framework 24 (FIG. 2) which along its upper generatrix comprises a longitudinal beam 26 which may be formed as one with the framework 24 or be attached thereto, this beam comprising means of attaching the members 28 for securing the engine to the airplane, these members 28 consisting, in the example depicted, of link rods or connecting rods which constitute a rigid and nondeformable assembly when their ends are fixed to the beam 26 and to the bearing structure 22.

The framework 24 of the downstream structural part 20 of the nacelle comprises an upstream annular flange 30 via which it is attached to a corresponding external annular flange of an intermediate case 32 of the engine, this intermediate case comprising, in a way known to those skilled in the art, a cylindrical internal annular part which surrounds the turbojet compressor and an external cylindrical annular part associated with the nacelle 10, the two cylindrical annular parts of the intermediate case generally being joined together by tubular radial arms through which auxiliaries can also pass.

The cylindrical framework 24 of the structural downstream part of the nacelle comprises wide lateral access openings 34 providing access to the turbojet, these openings being triangular in shape in the example of FIG. 2 and extending over a little more than 90° about the axis of the engine from a lower longitudinal member 36 of the framework, which is diametrically opposite the longitudinal beam 26.

The rear or downstream end of the framework 24 forms an annulus 38 which surrounds the exhaust case 40 of the turbojet and which supports this case by means of link rods or connecting rods 42 arranged in the form of an equilateral triangle and forming chords inside the annulus 38, these connecting rods 42 collaborating in their central part with the exhaust case via known means that form centering and sliding shoes, which allow the exhaust case 40 an axial expansion which may measure between 10 and 15 mm and a radial expansion which may measure between 4 and 5 mm when the engine is operating.

The longitudinal beam 26 of the cylindrical framework 24 of the downstream structural part of the nacelle and the securing members 28 allow the engine 10 to be attached under the wing of the airplane distributing the static and dynamic loads over at least part of the external circumference of the intermediate case 32 of the engine, this part ranging between 180° and 360° about the axis of the engine and preferably measuring 360°, that is to say that, in this case, the cylindrical framework 24 of the downstream cylindrical part of the nacelle is attached over the entire external circumference of the intermediate case and that the loads transmitted between the engine and the airplane are spread over this entire circumference.

The carcass distortion problems that were encountered in the prior art are thus avoided, and the problems associated with the overall flexing of the engine case line and which were due to the airplane thrust being reacted along a line offset from the axis of the engine are also avoided. The mass of the assembly comprising the engine and its means for securing to the airplane is also reduced thanks to the fact that the pylon used in the prior art is omitted, and all the means for securing the engine to the airplane are simplified and the dividing of the bypass air inside the nacelle in order to circumnavigate the means which, in the prior art, served to connect the turbojet to the pylon is also eliminated.

The engine may be attached under a wing as depicted schematically in FIG. 1 but may equally be attached to any other appropriate point and, for example, to the top of the wing, or the fuselage or the empennage of the airplane, it also being possible for the engine to be fully or partially incorporated into the wing.

Figure 3:
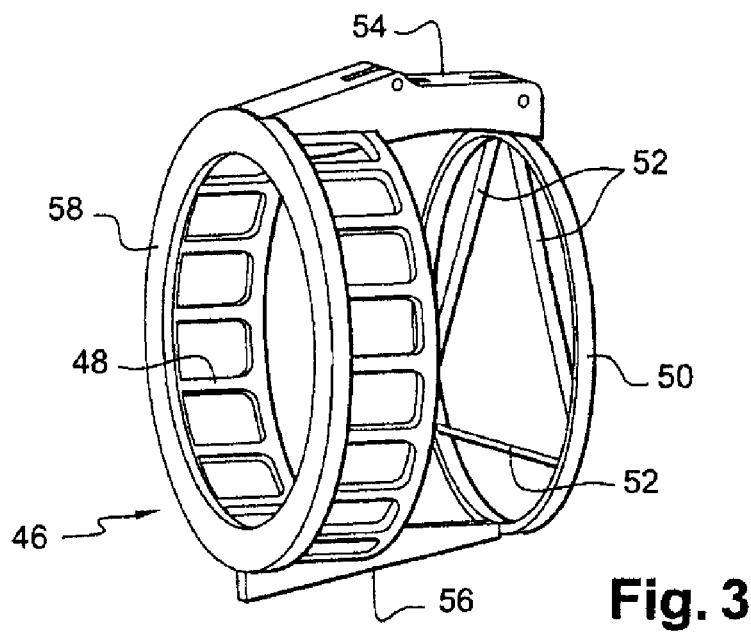
FIG. 3 is a schematic perspective view of the framework of the downstream cylindrical part of the nacelle, for an engine equipped with a thrust reverser.
Figure 4:
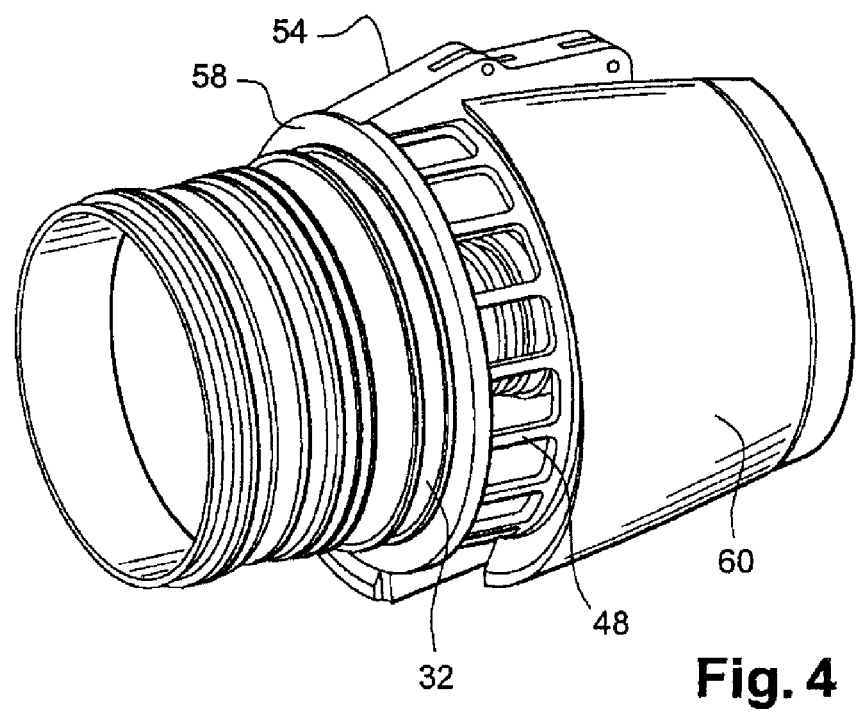
FIG. 4 is a schematic perspective view of the downstream cylindrical part of the nacelle fixed to an intermediate case.
Figure 5:
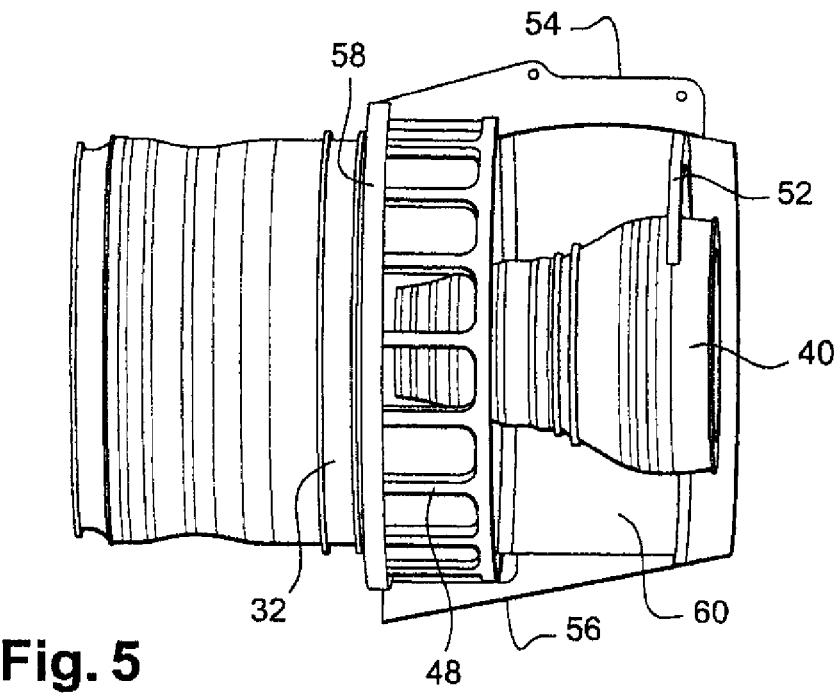
FIG. 5 is a schematic side view of the whole of FIG. 4, after a cowl has been removed.

The alternative form of embodiment of the invention as depicted in FIGS. 3 to 5 relates to an application of the invention to an engine equipped with a thrust reverser. In this case, the downstream cylindrical part 20 of the nacelle comprises a framework 46 depicted in FIG. 3, which is formed with a perforated upstream annular part 48 forming a lattice into or onto which an outlet cascade of the bypass air diverted via the thrust reverser is attached, this framework 46 possibly comprising a downstream annulus 50 similar to the downstream annulus of the cylindrical framework 24 of FIG. 2 and comprising link rods or rods 52 for supporting the turbojet exhaust case, these link rods or rods being mounted in the form of an equilateral triangle inside the annulus 50. The upstream annular part 48 and the downstream annulus 50 are connected by two diametrically opposed longitudinal members 54 and 56, the upper member 54 forming a longitudinal beam similar to the beam 26 of FIG. 2 and used to attach the means for securing the engine to part of the airplane. As in the first embodiment, the framework 46 comprises an upstream annular flange 58 for attachment to a corresponding external annular flange of the annular case 32 of the engine. Semi-cylindrical cowls 60 are mounted on the framework 46 so as to be able to slide between an upstream position in which the thrust reverser outlet cascade is closed and a downstream position in which this outlet cascade is uncovered, allowing the thrust reverser to operate.

In an alternative form in which the downstream annulus 50 is omitted, the link rods or rods 52 may be arranged in a pattern other than that of an equilateral triangle depicted in FIG. 3, these link rods or connecting rods 52 perhaps being radial or alternatively arranged in a V as depicted schematically in FIG. 5, in which they run between the downstream end of the longitudinal beam 54 and the upper part of the exhaust case 40. In this case, the cowls 60 are replaced by a cowl 61 in the form of a cylindrical duct, depicted schematically in FIG. 6, which can slide axially to allow the thrust reverser to operate and to facilitate maintenance.

In another alternative form, these link rods or connecting rods may run between the downstream annulus 50 of the framework 46 and an auxiliary case surrounding the exhaust case 40 and attached thereto.

Figure 6:
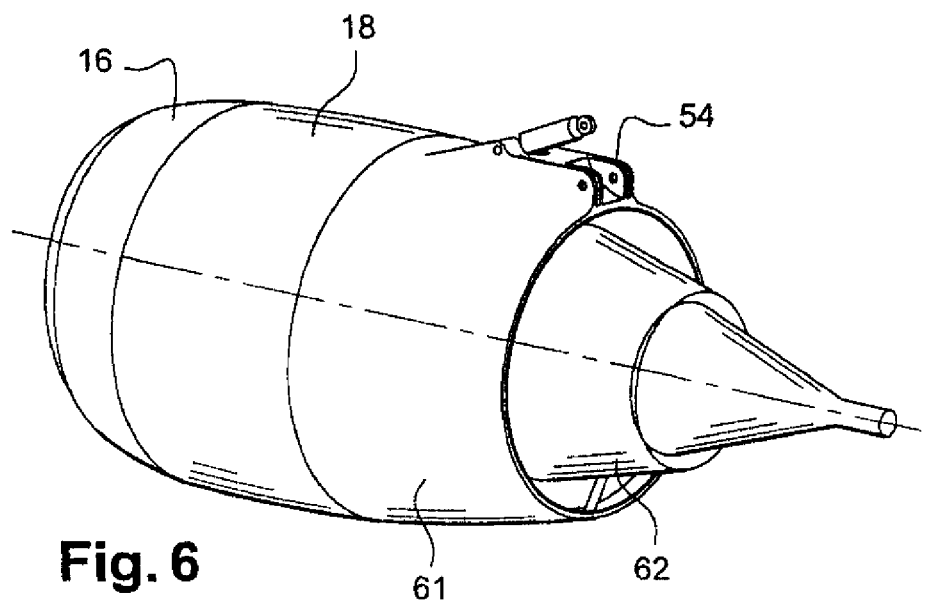
FIGS. 6 and 7 depict two alternative forms of embodiment of the invention.

In another alternative form of embodiment, a substantially cylindrical rigid shroud forming an internal surface for guiding the bypass air, generally termed IFS (Inner Fixed Structure) in the art, such as the one depicted at 62 in FIGS. 1 and 6, is attached at its upstream end to an internal flange of the intermediate case and supports the exhaust case at its downstream end, via means that allow axial and radial expansion of the exhaust case in operation. This rigid shroud contributes to reducing carcass distortions.

Figure 7:
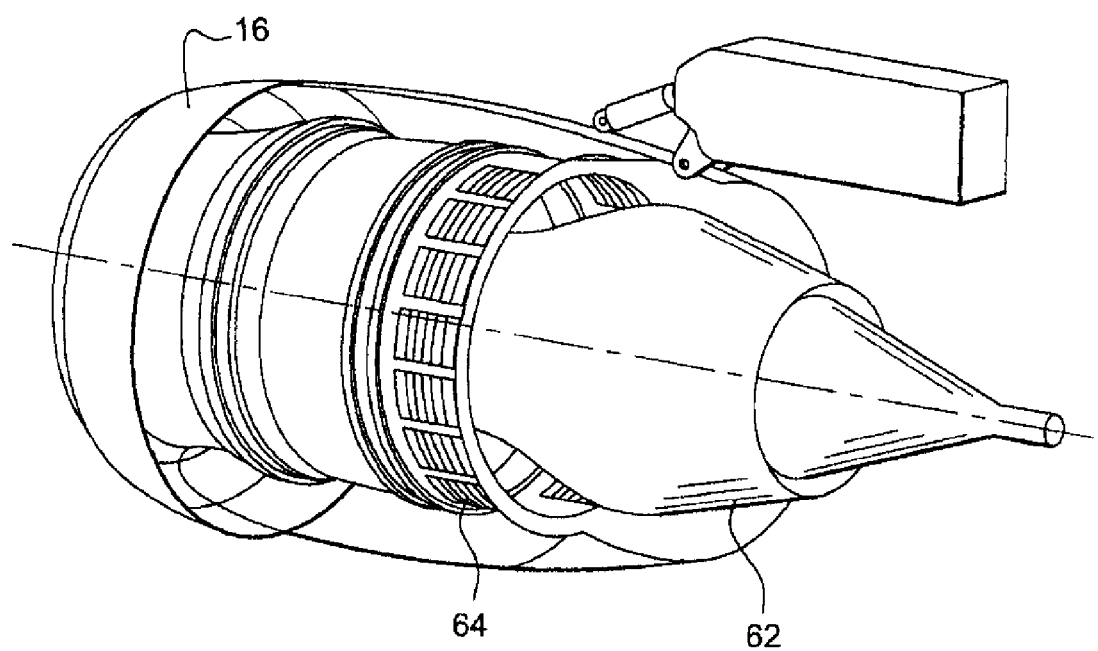

In another alternative form, the thrust reverser cascades 64 are housed in an elongate intermediate case upstream of the downstream part of the nacelle according to the invention, as depicted schematically in FIG. 7.

The invention claimed is:

1. An integrated propulsion system, comprising:
    a turbofan engine, the turbofan engine including an intermediate case; and
    a nacelle which bears the intermediate case of the turbofan engine which delimits an annular space for a flow of bypass air around the turbofan engine,
    wherein the nacelle includes a downstream cylindrical part which is rigid, the downstream cylindrical part includes an upstream annular flange disposed at an upstream end of the downstream cylindrical part which contacts at least 180 degrees about an axis of the turbofan engine of an external circumference of the intermediate case of the turbofan engine, an annulus disposed at a downstream end of the downstream cylindrical part which supports and guides an exhaust case of the turbofan engine with connecting rods arranged in the form of an equilateral triangle and securing members which secure the turbofan engine to the airplane,
    wherein the flow of bypass air passes between the upstream annular flange and the axis of the turbofan engine,
    wherein the upstream annular flange extends 360 degrees about the axis of the turbofan engine, and
    wherein the upstream annular flange is attached to the external circumference of the intermediate case of the turbofan engine.

2. The propulsion system as claimed in claim 1, wherein the securing members comprise a longitudinal beam attached to or formed as an additional thickness of the downstream cylindrical part, and
    wherein the flow of bypass air passes between the longitudinal beam and the axis of rotation of the turbofan engine.

3. The propulsion system as claimed in claim 2, wherein the securing members which secure the turbofan engine to the airplane comprise rods fixed at a first end to the longitudinal beam and fixed at a second end to the airplane, and
    wherein the rods are link rods or connecting rods.

4. The propulsion system as claimed in claim 1, wherein the downstream cylindrical part of the nacelle constitutes an external wall which guides the flow of bypass air.

5. The propulsion system as claimed in claim 1, wherein the upstream annular flange contacts 360 degrees of the external circumference of the intermediate case.

6. The propulsion system as claimed in claim 1, wherein the downstream end of the downstream cylindrical part of the nacelle is connected to the exhaust case by the rods, where the rods are attached to the securing members.

7. The propulsion system as claimed in claim 1, wherein the downstream cylindrical part comprises a framework attached to fairing or cowling panels.

8. The propulsion system as claimed in claim 1, wherein the downstream cylindrical part comprises access openings providing access to components of the turbofan engine and panels for closing the access openings.

9. The propulsion system as claimed in claim 1, wherein a cylindrical shroud forms a radially internal wall for guiding the flow of the bypass air, the cylindrical shroud is attached at an upstream end of the cylindrical shroud to the intermediate case, and the cylindrical shroud is connected at a downstream end of the cylindrical shroud to the exhaust case so as to allow axial and radial expansion of the exhaust case.

10. A downstream cylindrical part of a nacelle of a turbofan airplane engine, comprising:
    an external longitudinal beam comprising securing members which secure the engine to the airplane;
    a downstream end of the downstream cylindrical part which supports and guides an exhaust case of the turbofan engine with connecting rods arranged in the form of an equilateral triangle, and the downstream end is attached to the external longitudinal beam; and,
    an upstream annular flange disposed at an upstream end of the downward cylindrical part which contacts at least 180 degrees about an axis of the turbofan engine of an external circumference of an intermediate case of the turbofan engine,
    wherein a flow of bypass air passes between the upstream annular flange and the axis of the turbofan engine,
    wherein the upstream annular flange extends 360 degrees about the axis of the turbofan engine, and
    wherein the upstream annular flange is attached to the external circumference of the intermediate case of the turbofan engine.

11. The cylindrical part as claimed in claim 10, further comprising a perforated end forming a lattice into or onto which outlet cascades of a thrust reverser are attached.

12. An integrated propulsion system for an airplane, comprising:
    a turbofan engine which produces a flow of bypass air and a flow of combustion gases, the turbofan engine includes an exhaust case which receives the combustion gases after the combustion gases pass through a turbine of the turbofan engine, the turbofan engine including an intermediate case;
    a nacelle which bears the intermediate case of the turbofan engine which delimits an annular space for the flow of bypass air around the turbofan engine, the nacelle including a downstream cylindrical part;
    an upstream annular flange disposed at an upstream end of the downstream cylindrical part which contacts at least 180 degrees about an axis of the turbofan engine of an external circumference of an intermediate case of the turbofan engine;
    a downstream annulus disposed at a downstream end of the downstream cylindrical part which is secured to the exhaust case with connecting rods;
    a longitudinal beam which forms a rigid structure with the upstream annular flange and the downstream annulus, and the longitudinal beam secures the turbofan engine to the airplane; and a longitudinal member which is attached to the upstream annular flange and the downstream annulus in the rigid structure, and the longitudinal member is diametrically opposed to the longitudinal beam, wherein the flow of bypass air passes between the longitudinal beam and an axis of rotation of the turbofan engine, wherein the connecting rods are arranged in a form of an equilateral triangle, wherein the upstream annular flange extends 360 degrees about the axis of the turbofan engine, and wherein the upstream annular flange is attached to the external circumference of the intermediate case of the turbofan engine.

* * * * *